US009665945B2

(12) United States Patent
Wang et al.

(10) Patent No.: US 9,665,945 B2
(45) Date of Patent: May 30, 2017

(54) TECHNIQUES FOR IMAGE SEGMENTATION (71) Applicant: Xiaomi Inc., Beijing (CN)

(72) Inventors: Lin Wang, Beijing (CN); Xiaozhou Xu, Beijing (CN); Zhijun Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/669,888

(22) Filed: Mar. 26, 2015

(65) Prior Publication Data
US 2016/0027187 A1 Jan. 28, 2016

Related U.S. Application Data (63) Continuation-in-part of application No. PCT/CN2014/091643, filed on Nov. 19, 2014.

(30) Foreign Application Priority Data

Jul. 23, 2014 (CN) .......................... 2014 1 0353140

(51) Int. Cl.
*G06K 9/00* (2006.01)
*G06T 7/00* (2017.01)
(Continued)

(52) U.S. Cl.
CPC ........ *G06T 7/0087* (2013.01); *G06K 9/00268* (2013.01); *G06K 9/00288* (2013.01);
(Continued)

(58) Field of Classification Search
CPC ... G06T 7/0087; G06T 7/0042; G06T 7/0083; G06T 7/0081; G06T 2207/20144;
(Continued)

(56) References Cited

U.S. PATENT DOCUMENTS

2003/0133599 A1\* 7/2003 Tian .................. G06K 9/00308
382/118
2003/0156759 A1 8/2003 Colmenarez et al.

FOREIGN PATENT DOCUMENTS

CN 102436636 A 5/2012
CN 102436637 A 5/2012
(Continued)

OTHER PUBLICATIONS

Campbell, Neill DF, et al. "Automatic 3d object segmentation in multiple views using volumetric graph-cuts." Image and Vision Computing 28.1 (2010): 14-25.\*
Office action issued in Japanese Patent Application No. 2016-535336, received on Oct. 4, 2016, 3 pages.
Extended European Search Report dated Dec. 9, 2015 for European Application No. 15175108.8, 9 pages.
(Continued)

*Primary Examiner* — Andrew Moyer
(74) *Attorney, Agent, or Firm* — Quarles & Brady LLP (57) ABSTRACT

Techniques for image segmentation can include receiving image data of an image including a background and a face of a person in a foreground, and determining a respective a priori probability of a head-shoulder foreground pixel appearing per pixel of the plurality of pixels, according to a positioning result of a plurality of exterior contour points of the face. The techniques can also include selecting foreground and background pixels of the plurality of pixels, according to at least the a priori probabilities, and determining respective color likelihood probabilities of the foreground and the background, according to color feature vectors of the selected pixels. The techniques can also include determining respective posteriori probabilities of at least part of the foreground and at least part of the background, according to the a priori probabilities and the respective color likelihood probabilities. The techniques can also include performing segmentation on the plurality of pixels, according to the respective posteriori probabilities.

20 Claims, 4 Drawing Sheets (51) Int. Cl.
*G06K 9/46* (2006.01)
*G06K 9/52* (2006.01)
*G06K 9/62* (2006.01)
*G06T 7/73* (2017.01)
*G06T 7/11* (2017.01)
*G06T 7/12* (2017.01)
*G06T 7/143* (2017.01)
*G06T 7/194* (2017.01)
*G06T 7/136* (2017.01)

(52) U.S. Cl.
CPC ......... *G06K 9/4604* (2013.01); *G06K 9/4652* (2013.01); *G06K 9/52* (2013.01); *G06K 9/6218* (2013.01); *G06T 7/0042* (2013.01); *G06T 7/0083* (2013.01); *G06T 7/11* (2017.01); *G06T 7/12* (2017.01); *G06T 7/143* (2017.01); *G06T 7/73* (2017.01); *G06K 9/00234* (2013.01); *G06K 9/6278* (2013.01); *G06T 7/136* (2017.01); *G06T 7/194* (2017.01); *G06T 2207/20144* (2013.01); *G06T 2207/30201* (2013.01)

(58) Field of Classification Search
CPC .. G06T 2207/302; G06K 9/6218; G06K 9/52; G06K 9/00288; G06K 9/00268; G06K 9/4604; G06K 9/4652; G06K 9/6278; G06K 9/00234
USPC .......................................... 382/164, 171, 173
See application file for complete search history.

(56) References Cited

FOREIGN PATENT DOCUMENTS

| | | | |
|---|---|---|---|
| CN | 102567998 | A | 7/2012 |
| CN | 103871050 | A | 6/2014 |
| CN | 103871060 | A | 6/2014 |
| EP | 2 669 865 | A1 | 12/2013 |
| JP | 2004199669 | A | 7/2004 |
| JP | 2006508461 | A | 3/2006 |
| JP | 2010-282276 | A | 12/2010 |
| JP | 2012-003719 | A | 1/2012 |
| KR | 20030050617 | A | 6/2003 |
| KR | 1020020042485 | A | 3/2005 |
| WO | WO 2013/178725 | A1 | 12/2013 |

OTHER PUBLICATIONS

International Search Report dated May 6, 2015 for International Application No. PCT/CN2014/091643, 3 pages.
Stauffer, Chris et al., "Adaptive Background Mixture Models for Real-Time Tracking," Proceedings of the 1999 IEEE Computer Society Conference on Computer Vision and Pattern Recognition, IEEE, vol. 2, 1999, pp. 246-252.
Sun, Bo et al, "The Research of Image Segmentation Based on Bayesian Estimation," Value Engineering, No. 17, 2012, (2 pages).
Xin, Hai et al., "Human Head-Shoulder Segmentation," Automatic Face & Gesture Recognition and Workshops, IEEE, 2011, pp. 227-232.
Zhang, Qingli et al., "Fast Segmentation for Head-Shoulder Video Sequence," Computer Engineering, vol. 20, No. 31, 2005, (3 pages).
Notice of Allowance for KR 520130487991 dated Nov. 25, 2016.

\* cited by examiner

TECHNIQUES FOR IMAGE SEGMENTATION

CROSS-REFERENCE TO RELATED APPLICATIONS/INCORPORATION BY REFERENCE

This application is a continuation-in-part of International Application No. PCT/CN2014/091643, filed Nov. 19, 2014, which is based upon and claims priority to Chinese Patent Application No. 201410353140.7, filed Jul. 23, 2014, the entire contents of which are incorporated herein by reference.

TECHNICAL FIELD

The present disclosure relates to the field of image processing technology and image segmentation.

BACKGROUND

Image segmentation has been applied to background and foreground replacement in still images and even video. For example, video conferencing has been known to use background replacements using segmentation.

Segmentation can include partitioning a digital image into multiple segments, with each segment including one or more pixels. A benefit of segmentation is that it can be used simplify an image so that it is easier to analyze. Segmentation can also be used to locate objects and boundaries of objects in images, such as a face or head and shoulders of a person. Also, segmentation can include the process of assigning a label to every pixel in an image such that pixels with the same label share certain characteristics.

A result of segmentation can include a set of segments that collectively cover the entire image or a set of contours extracted from the image, for example. Each of the pixels in a region can be similar with respect to some characteristic or computed property, such as color, intensity, or texture. Adjacent regions can be significantly different with respect to the same characteristic(s).

In using segmentation, such as head-shoulder segmentation, often a user is instructed to select a first sample pixel of a foreground, such as a head-shoulder foreground, and a second sample pixel of a background when performing segmentation of an image. Afterwards, a color feature vector of the first sample pixel and a color feature vector of the second sample pixel are determined, respectively, to obtain a first color feature vector of the foreground and a second color feature vector of the background. Next, color modeling can be performed on the foreground and the background, according to the first color feature vector and the second color feature vector to obtain respective color models. Finally, the models can be used to implement segmentation on the image. One of the many problems with such image segmentation is automating the selection of foreground and background pixels used as seeds for the segmentation.

SUMMARY

The present disclosure provides techniques for image segmentation. Each of the techniques described herein can be implemented by circuitry. Each of the techniques can also be implemented by circuitry and/or software. Also, each of these techniques can be implemented through instructions of a non-transitory computer readable medium. The techniques can include receiving image data of an image including a background and a face of a person in a foreground. The image data also can include data representative of a plurality of pixels of the image and a positioning result of a plurality of exterior contour points of the face. The techniques can also include determining a respective a priori probability of an appearing foreground pixel per pixel of the plurality of pixels, according to the positioning result of the plurality of exterior contour points of the face. For example, the techniques can include determining an a priori probability of a head-shoulder foreground pixel appearing at each pixel in an image, according to a positioning result of exterior contour points of face. An image can have a preset size. A pixel can also have a preset size.

The techniques can also include selecting foreground pixels and background pixels of the plurality of pixels, according to the a priori probabilities, a foreground probability threshold, and a background probability threshold. Also, the techniques can include determining a first color likelihood probability of the foreground and a second color likelihood probability of the background, according to color feature vectors of the selected foreground pixels and the selected background pixels. The techniques can also include determining a first a posteriori probability of at least part of the foreground and a second a posteriori probability of at least part of the background according to the a priori probabilities, the first color likelihood probability and the second color likelihood probability. The techniques can also include performing segmentation, such as head-shoulder segmentation, on the plurality of pixels, according to the first a posteriori probability and the second a posteriori probability. The techniques can also include communicating the image with the segmented plurality of pixels to display circuitry.

In an example, the determining of a respective a priori probability of a foreground pixel appearing per pixel of the plurality of pixels can also be according to an aggregation of corresponding pixels from a group of images including faces of people. The aggregation can include selecting a first group of images including faces of people. The group of images including faces of people may only include images of female faces or male faces. Also, the aggregation can include generating a calibrated image for each image of the group of images. Each calibrated image can be based on a foreground calibration result of a corresponding image of the group of images. The aggregation can also include: positioning exterior contour characteristic points of a face for each image of the group of images to obtain a positioning result per image of the group of images; performing alignment and size normalization on each image of the calibrated images, according to the corresponding positioning results to generate a second group of images having a set alignment, size, or both; and determining the a priori probability of a foreground pixel appearing for a pixel at a same position in each of the second group of images, according to the foreground calibration result.

The techniques can also include identifying a sex characteristic of the face in the foreground. The techniques can also include further determining the respective a priori probability of a foreground pixel appearing per pixel of the plurality of pixels, according to the sex characteristic of the face in the foreground. They can also include further selecting one or more of the foreground pixels and the background pixels according the sex characteristic of the face in the foreground. They can also include setting one or more of the foreground probability threshold and the background probability threshold according to the sex characteristic of the face in the foreground.

In an example, the determining of a respective a priori probability of an foreground pixel appearing per pixel of the plurality of pixels is according to the following formula:

$$P(I_{(x_i,y_i)} = 1) = \frac{\sum_{j=1}^{N} I_{(x_i,y_i)}^{j}}{N},$$

wherein $P(I_{(x_i,y_i)}=1)$ denotes an a priori probability of a foreground pixel appearing at a pixel $(x_i,y_i)$, wherein $I_{(x_i,y_i)}^{j}$ denotes a calibration result at the pixel $(x_i,y_i)$ in a $j^{th}$ image of a group of images including faces of people, wherein $I_{(x_i,y_i)}^{j}=1$ denotes that the pixel $(x_i,y_i)$ in the $j^{th}$ image is calibrated as a foreground, wherein $I_{(x_i,y_i)}^{j}=0$ denotes that the pixel $(x_i,y_i)$ in the $j^{th}$ image is calibrated as a background, and wherein N refers to a number of images in the group of images including faces of people.

In an example, the selecting foreground pixels and the background pixels of the plurality of pixels, according to the a priori probabilities, the foreground probability threshold, and the background probability threshold can include identifying and selecting a foreground pixel where a respective a priori probability of a given pixel of the plurality of pixels is greater than the foreground probability threshold. The selection can also include identifying and selecting a background pixel where a respective a priori probability of the given pixel of the plurality of pixels is less than the background probability threshold. In such an example, the background probability threshold is less than the foreground probability threshold.

In an example, the determining a first color likelihood probability of the foreground and a second color likelihood probability of the background, according to color feature vectors of the selected foreground pixels and the selected background pixels, can be according to the following formulas:

$$P(\overline{(R, G, B)} \mid I_{(x_i,y_i)} = 1) = \sum_{j}^{N_F} w_j * \exp\left(-\frac{dist(\overline{(R, G, B)}, \overline{(R_j, G_j, B_j)})}{2 * \beta_F}\right),$$

and $$P(\overline{(R, G, B)} \mid I_{(x_i,y_i)} = 0) = \sum_{j}^{N_B} w_j * \exp\left(-\frac{dist(\overline{(R, G, B)}, \overline{(R_j, G_j, B_j)})}{2 * \beta_B}\right),$$

wherein $\overline{(R_j,G_j,B_j)}$ denotes a color feature vector of a $j^{th}$ clustering center, wherein $P(\overline{(R,G,B)}|I_{(x_i,y_i)}=1)$ denotes the first color likelihood probability, wherein $P(\overline{(R,G,B)}|I_{(x_i,y_i)}=0)$ denotes the second color likelihood probability, wherein $N_F$ denotes a number of clustering centers of the selected foreground pixels, wherein $N_B$ denotes a number of clustering centers of the selected background pixels, wherein $dist(\overline{(R,G,B)},\overline{(R_j,G_j,B_j)})$ denotes an Euclidean distance from an origin color feature vector, $\overline{(R,G,B)}$, to the color feature vector of the $j^{th}$ clustering center, $\overline{(R_j,G_j,B_j)}$, wherein $w_j$ denotes a ratio of a number of selected pixels of the $j^{th}$ clustering center to a number of total selected pixels, wherein $\beta_F$ denotes a mean Euclidean distance between color feature vectors of different foreground clustering centers, and wherein $\beta_B$ denotes a mean Euclidean distance between color feature vectors of different background clustering centers. In such an example, the $\beta_F$ and $\beta_B$ can be defined by the following formulas:

$$\beta_F = \frac{2}{N_F(N_F - 1)} \sum_{i=1}^{N_F} \sum_{j=1, j\neq i}^{N_F} dist(\overline{(R_i, G_i, B_i)}, \overline{(R_j, G_j, B_j)}), \text{ and}$$

$$\beta_B = \frac{2}{N_B(N_B - 1)} \sum_{i=1}^{N_B} \sum_{j=1, j\neq i}^{N_B} dist(\overline{(R_i, G_i, B_i)}, \overline{(R_j, G_j, B_j)}).$$

In an example, the determining of the first a posteriori probability and the second a posteriori probability, according to the a priori probabilities, the first color likelihood probability, and the second color likelihood probability, can also be according to the following formulas:

$$P(I_{(x_i,y_i)}=1|\overline{(R,G,B)}) \propto P(I_{(x_i,y_i)}=1)*P(\overline{(R,G,B)}|I_{(x_i,y_i)}=1),$$
and $$P(I_{(x_i,y_i)}=0|\overline{(R,G,B)}) \propto (1-P(I_{(x_i,y_i)}=1))*P(\overline{(R,G,B)}|I_{(x_i,y_i)}=0),$$

wherein $P(I_{(x_i,y_i)}=1|\overline{(R,G,B)})$ denotes the a posteriori probability of the foreground at pixel, wherein $P(I_{(x_i,y_i)}=1|\overline{(R,G,B)})$ denotes the a posteriori probability of the background at a pixel, wherein $P(I_{(x_i,y_i)}=0|\overline{(R,G,B)})$ denotes an a priori probability of a foreground pixel appearing at a pixel $(x_i,y_i)$, wherein $P(\overline{(R,G,B)}|I_{(x_i,y_i)}=1)$ denotes the first color likelihood probability, and wherein $P(\overline{(R,G,B)}|I_{(x_i,y_i)}=0)$ denotes the second color likelihood probability.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
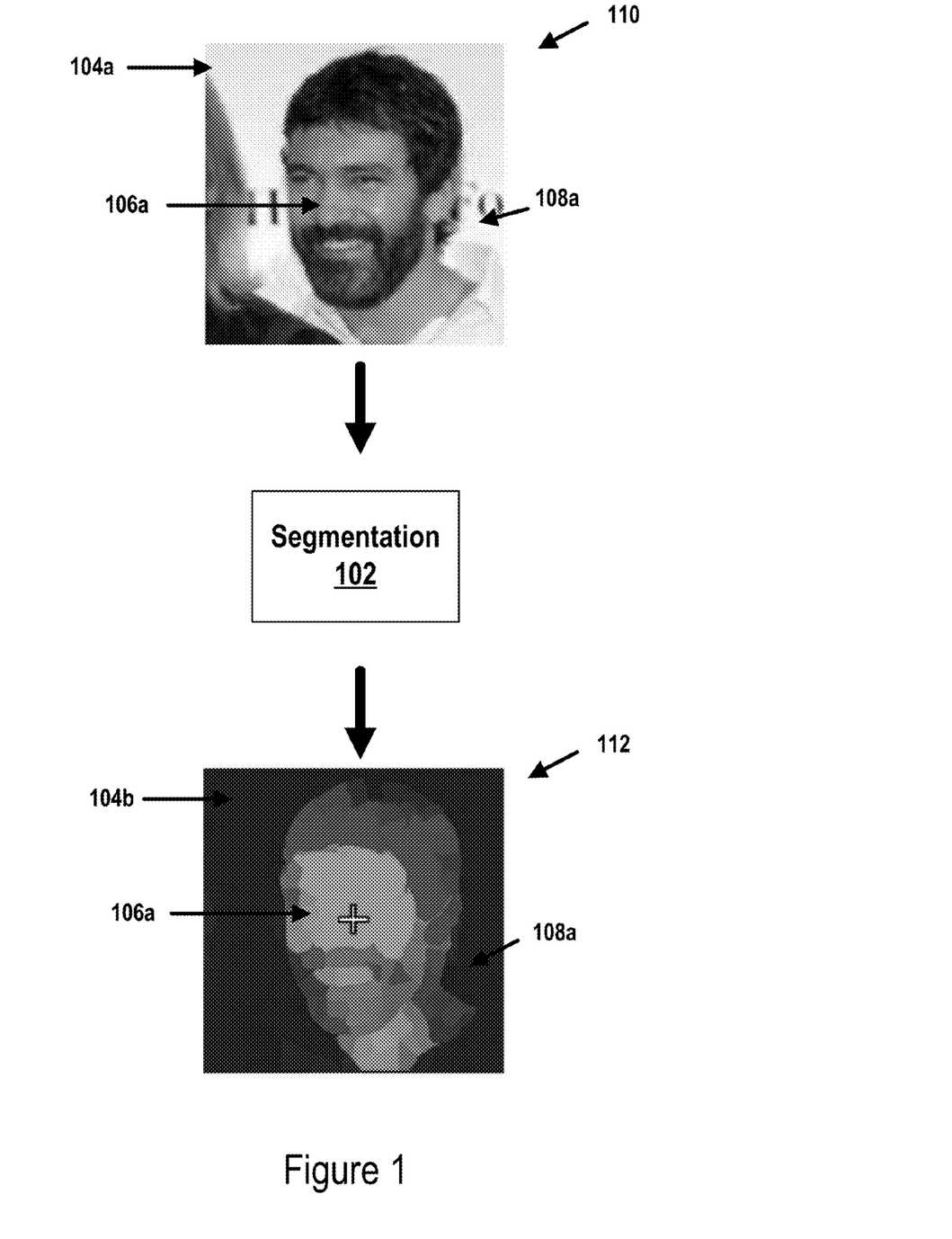
FIG. 1 illustrates an example image before and after an example segmentation.

FIG. 1 illustrates an example image before and after an example segmentation 102. The illustrated image includes an initial background 104a and a face 106a of a person in an initial foreground 108a that is a head-shoulder foreground. The illustrated image also includes a segmented background 104b and a segmented face 106b of a person in a segmented foreground 108b. As illustrated in FIG. 1, the segmentation 102 includes partitioning a digital image 110 of a head and shoulders of a male subject into multiple segments, with each segment including multiple pixels. A benefit of this segmentation is that the image of the head and shoulders is simplified for analysis, which can conserve computer processing and memory resources used for the analysis the image. This segmentation can also be used to locate objects or parts of the face 106a and boundaries of the head and shoulders of the person, automatically, by an image signal processor. As illustrated in FIG. 1, the segmented image 112 includes a set of segments that collectively cover the entire image and each segment has been designated a color.

Figure 2:
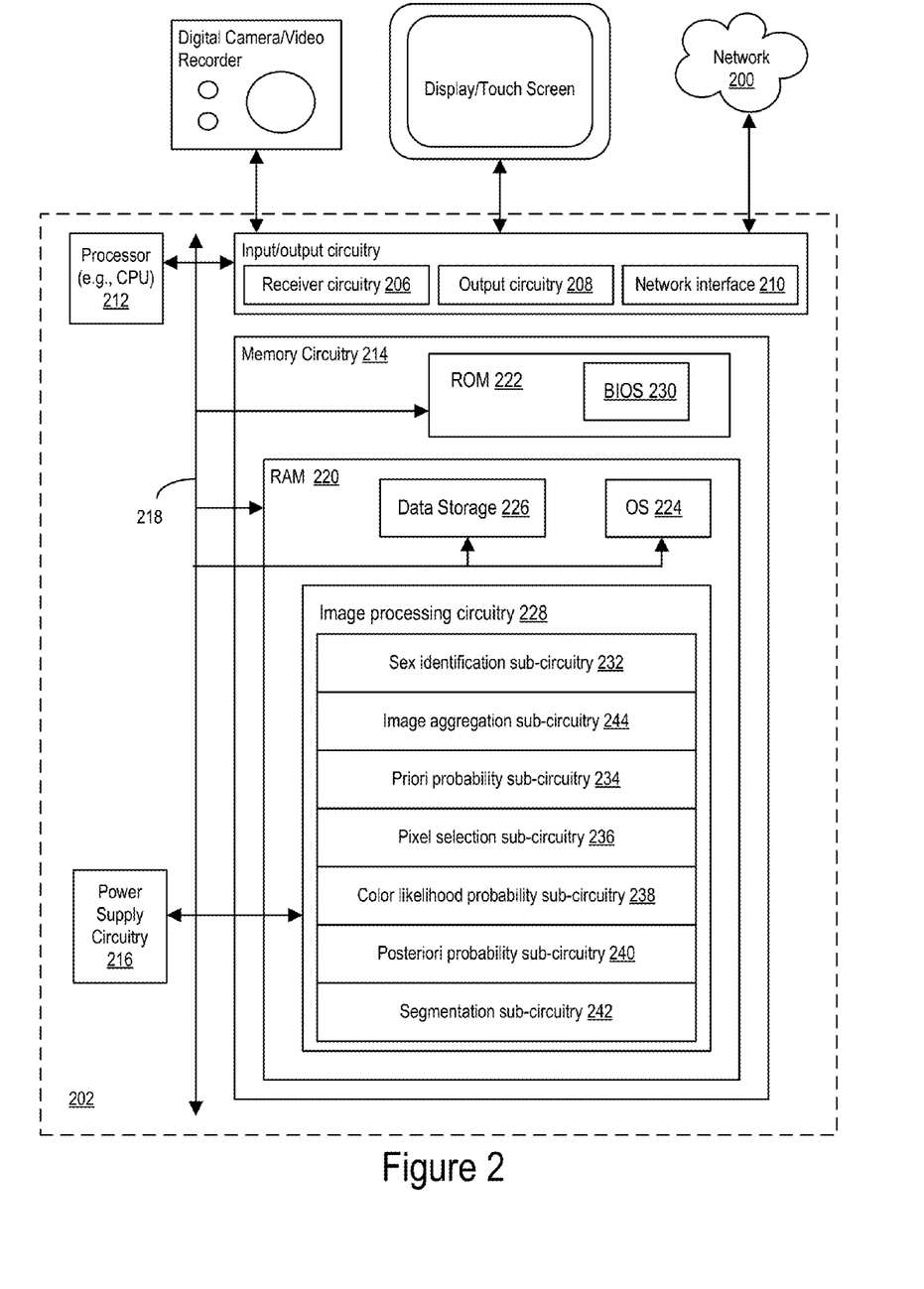
FIG. 2 illustrates an example device for segmenting an image, such the example segmentation illustrated in FIG. 1.

FIG. 2 illustrates an example device 202 for segmenting an image, such a device that can perform the segmentation 102. The device 202 may be a mobile device (such as a smartphone or a tablet), a personal computer, a server computer, a digital broadcast terminal (such as a smart TV), a messaging device, a gaming console, a medical device, exercise equipment, and a personal digital assistant, for example. The device 202 includes image processing circuitry 228 and input/out circuitry, such as receiver circuitry 206 and output circuitry 208. The input/output circuitry also includes a network interface 210. The device 202 also includes a processor 212, memory circuitry 214, a power supply circuitry 216, and a communication bus 218 that connects the aforementioned elements of the device.

The processor 212 can be any type of data processing device, such as a central processing unit (CPU). Also, for example, the processor 212 can be central processing logic. The device 202 may also include or at least connect to a display, a touchscreen, a digital camera, at least one sensor (such as an image sensor for the camera) or any other type of multimedia device. Each of these components may interact with the image processing circuitry 228 and the processor 212. Also, the processor 212 may control operations of the device 202, such as the operations associated with display, telephone calls, data communications, camera operations, recording operations, and various types of data processing, such as image data processing described herein. The processor 212 may be associated with coprocessors.

The memory circuitry 214, which can include random access memory (RAM) 220 or read-only memory (ROM) 222, can be enabled by various types of known memory devices. The RAM 220 can store data and instructions defining an operating system 224, data storage 226, and image processing circuitry 228. Although in FIG. 2 the image processing circuitry is depicted as a part of the RAM 220, in these examples and others, the image processing circuitry may include hardware (such as microprocessors), firmware, software, or any combination thereof. The ROM 222 can include basic input/output system (BIOS) 230 of the electronic device 202. Aspects of the memory circuitry 214 can store various types of data to support operations of the device 202, such as in the data storage circuitry 226. Examples of such data include instructions for any applications or operations of the device 202, messages, pictures, and video. Aspects of the memory circuitry 214 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), such as ROM 222, a magnetic memory, a flash memory, a magnetic or optical disk, or any combination thereof.

The input/output components can include the interfaces for facilitating communication between any components of the electronic device 202, components of external devices (such as a digital camera, a digital video recorder, a display, or components of other devices of a network 200), and end users. For example, such components can include a network card that is an integration of a receiver, a transmitter, and I/O interfaces. The I/O components, can include user interfaces such as monitors, keyboards, touchscreens, microphones, and speakers. Further, some of the I/O components and the bus 218 can facilitate communication between components of the electronic device 202, and can ease processing performed by the processor 212.

Multimedia devices included in or associated with the device 202 may include a screen providing an output interface between the device and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some examples, an included multimedia device may include a front camera and/or a rear camera. The front camera and/or the rear camera may receive an external multimedia datum while the device 202 is in an operation mode, such as a photographing mode or a video mode. Each of the front camera and the rear camera may be a fixed optical lens system or have focus and optical zoom capability. The multimedia devices may include an audio component configured to output and/or input audio signals. For example, an audio component may include a microphone configured to receive an external audio signal when the device 202 is in an operation mode, such as a call mode, a recording mode, and a voice recognition mode. The received audio signal may be further stored in a part of the memory circuitry 214 or transmitted via the network interface 210. In some examples of the device 202, a speaker may be included.

The depicted input/output circuitry of the device 202 may provide provide an interface between the processor 212 and peripheral interface components, such as a keyboard, a click wheel, an buttons, for example. The buttons may include a home button, a volume button, a starting button, and a locking button.

The sensor components of the device 202 may include one or more sensors to provide status assessments of various aspects of the device. For example, a sensor component may detect an open/closed status of the device 202, relative positioning of the device and its components (e.g., a display and a keypad) of the device 202, a change in position of the device or a component of the device, a presence or absence of user contact with the device, an orientation or an acceleration/deceleration of the device, and a change in temperature of the device. A sensor component may include a proximity sensor configured to detect the presence of nearby objects without any physical contact. A sensor component may also include a light sensor, such as a CMOS or CCD image sensor, for use in imaging applications. In some examples, a sensor component may also include an accelerometer sensor, a gyroscope sensor, a magnetic sensor, a pressure sensor, or a temperature sensor. In some examples, the sensor component may also include an accelerometer sensor, a gyroscope sensor, a magnetic sensor, a pressure sensor, or a temperature sensor.

The network interface 210 can include a receiver and a transmitter (or a transceiver), and an antenna for wireless communications. The network interface 210 may be configured to facilitate communication, wired or wirelessly, between the device 202 and other devices. The device 202 can access a wireless network based on a communication standard, such as WiFi, 2G, or 3G, or a combination thereof. In an example, the network interface 210 may receive a broadcast signal or broadcast associated information from an external broadcast management system via a broadcast channel. Also, the network interface 210 may include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

The power supply circuitry 216 contains power components, and facilitates supply and management of power to the electronic device 202. The power supply circuitry 216 may provide power to various components of the device 202. The power supply circuitry 216 may include a power management system, one or more power sources, and any other components associated with the generation, management, and distribution of power in the device 202.

The aspects of the device 202 described herein may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. Also, aspects may be provided by a non-transitory computer-readable storage medium including instructions, such as included in the memory circuitry 214, executable by the processor 212, for performing operations described herein. For example, the non-transitory computer-readable storage medium may be a ROM, a RAM, a CD-ROM, a magnetic tape, a floppy disc, an optical data storage device, or any combination thereof.

In an example, an I/O component of the device 202, receiver circuitry 206, can be configured to receive image data of an image to be segmented including a background and a face of a person in a foreground. The image data can include data representative of a plurality of pixels of the image and a positioning result of a plurality of exterior contour points of the face. The output circuitry 208 can be configured to communicate the image with the segmented plurality of pixels to display circuitry.

The image processing circuitry 228 is communicatively coupled to the receiver circuitry 206 and the output circuitry 208. The image processing circuitry 228 can include sex identification sub-circuitry 232 configured to identify a sex characteristic of the face in the foreground. The image processing circuitry 228 can also include an a priori probability sub-circuitry 234 configured to determine a respective a priori probability of a foreground pixel appearing per pixel of the plurality of pixels, according to the positioning result of the plurality of exterior contour points of the face and/or the sex characteristic of the face. For example, the a priori probability sub-circuitry 234 can determine an a priori probability of a head-shoulder foreground pixel appearing at each pixel in an image having a preset size, according to a positioning result of exterior contour points of face and/or the sex characteristic of the face. The sex identification sub-circuitry 232 operating with the a priori probability sub-circuitry 234 can assist in the determination of the respective a priori probability of a foreground pixel appearing per pixel of the plurality of pixels, according to the sex characteristic of the face in the foreground.

In an example, determining the a priori probability can include determining the probability of a given event occurring, which can be 1/N, where there are N mutually exclusive and exhaustive events and such events are equally likely. Additionally or alternatively, in an example, the determining the a priori probability can include determining the a priori probability of one of a given collection of K events, which results in K/N. In the examples described herein, the given event can be the head-shoulder foreground pixel appearing at a given pixel of an image to be segmented.

In an example, the a priori probability sub-circuitry 234 is configured to select a preset number of frontal face images of females and/or males. The a priori probability sub-circuitry 234 can then generate a head-shoulder calibrated image of each frontal face image of female and/or male subject according to a head-shoulder foreground calibration result provided by user or automatically on each frontal face image. The a priori probability sub-circuitry 234 can then position exterior contour characteristic points of face in each frontal face image of the female and/or male subject to obtain a positioning result. The a priori probability sub-circuitry 234 then performs alignment and size normalization on each head-shoulder calibrated image, according to the positioning result of the exterior contour points of the face, to obtain a multiple of images having a preset size. Then, with respect to the pixel at the same position in the set of images having the preset size, the circuitry determines the a priori probability of a head-shoulder foreground pixel appearing at the pixel, according to the head-shoulder foreground calibration result.

In an example, the a priori probability sub-circuitry 234 can be configured to determine of a respective a priori probability of a foreground pixel appearing per pixel of the plurality of pixels also according to an aggregation of corresponding pixels from a group of images including faces of people performed by image aggregation sub-circuitry 244. The aggregation can include selecting a first group of images including faces of people. The group of images including faces of people, may only include images of female faces or male faces. Also, the aggregation can include generating a calibrated image for each image of the group of images. Each calibrated image can be based on a foreground calibration result of a corresponding image of the group of images. The aggregation can also include: positioning exterior contour characteristic points of a face for each image of the group of images to obtain a positioning result per image of the group of images; performing alignment and size normalization on each image of the calibrated images according to the corresponding positioning results to generate a second group of images having a set alignment, size, or both; and determining the a priori probability of a head-shoulder foreground pixel appearing at a same position in each of the second group of images, according to the foreground calibration result. Although not depicted, the image aggregation sub-circuitry can include respective sub-circuitry for each of its functions.

In an example, the a priori probability sub-circuitry 234 can be configured to determine a respective a priori probability of a foreground pixel appearing per pixel of the plurality of pixels, according to the following formula:

$$P(I_{(x_i,y_i)} = 1) = \frac{\sum_{j=1}^{N} I_{(x_i,y_i)}^{j}}{N},$$

wherein $P(I_{(x_i,y_i)}=1)$ denotes an a priori probability of a foreground pixel appearing at a pixel $(x_i,y_i)$,
wherein $I_{(x_i,y_i)}$ denotes a calibration result at the pixel $(x_i,y_i)$ in a $j^{th}$ image of a group of images including faces of people,
wherein $I_{(x_i,y_i)}=1$ denotes that the pixel $(x_i,y_i)$ in the $j^{th}$ image is calibrated as a foreground,
wherein $I_{(x_i,y_i)}=0$ denotes that the pixel $(x_i,y_i)$ in the $j^{th}$ image is calibrated as a background, and
wherein N refers to a number of images in the group of images including faces of people.

The image processing circuitry 228 can also include pixel selection sub-circuitry 236 configured to select foreground pixels and background pixels of the plurality of pixels, according to the a priori probabilities, a foreground probability threshold, and/or a background probability threshold. Also, the sex identification sub-circuitry 232 operating with the pixel selection sub-circuitry 236 can assist in the selection of one or more of the foreground pixels and the background pixels, according to the sex characteristic of the face in the foreground. The sex identification sub-circuitry 232 can also assist in the setting of the foreground probability threshold and/or the background probability threshold, according to the sex characteristic of the face in the foreground.

In an example, the pixel selection sub-circuitry 236 can be configured to select foreground pixels and the background pixels of the plurality of pixels by identifying and selecting a foreground pixel where a respective a priori probability of a given pixel of the plurality of pixels is greater than the foreground probability threshold. The selection can also include identifying and selecting a background pixel where a respective a priori probability of the given pixel of the plurality of pixels is less than the background probability threshold. In such an example, the background probability threshold is less than the foreground probability threshold.

In an example, the pixel selection sub-circuitry 236 is configured to identify sex of the person in the image to be segmented to obtain a sex identification result. Subsequently, an a priori probability sub-circuitry 234 can determine an a priori probability corresponding to the image to be segmented according to the sex identification result. With respect to each pixel in the image to be segmented, the pixel selection sub-circuitry 236 can determine whether the a priori probability of the pixel is larger than a preset head-shoulder foreground probability threshold. Where the a priori probability of the pixel is larger than the head-shoulder foreground probability threshold, the pixel is identified as a foreground sample pixel. Also, with respect to each pixel in the image to be segmented, the pixel selection sub-circuitry 236 can determine whether the a priori probability of the pixel is smaller than a preset background probability threshold. Where the a priori probability of the pixel is smaller than the background probability threshold, the pixel is identified as a as a background sample pixel.

The image processing circuitry 228 can also include color likelihood probability sub-circuitry 238 configured to determine a first color likelihood probability of the foreground and a second color likelihood probability of the background, according to color feature vectors of the selected foreground pixels and the selected background pixels. For example, the circuitry can determine the highest probable color to appear in the foreground and/or a probability of that highest probable color appearing in the foreground. Also, the circuitry can determine a range or a set of probable colors to appear in the foreground and/or a probability of that range or set appearing in the foreground. Also, for example, the circuitry can determine the highest probable color to appear in the background and/or a probability of that highest probable color appearing in the background. Also, the circuitry can determine a range or a set of probable colors to appear in the background and/or a probability of that range or set appearing in the background.

Before determining the first color likelihood probability and the second color likelihood probability (e.g., before obtaining the color likelihood model), examples can cluster the head-shoulder foreground sample pixels and the background sample pixels, according to the relativity among colors. During clustering, examples can cluster the head-shoulder foreground sample pixels into a certain number of clustering centers, such as five clustering centers. Where the background is more complex, such as a background that has more variation in color, the examples can cluster the head-shoulder foreground sample pixels into an even greater number of clustering centers, such as fifteen clustering centers.

In an example, the color likelihood probability sub-circuitry 238 can be configured to determine a first color likelihood probability of the foreground and a second color likelihood probability of the background, according to color feature vectors of the selected foreground pixels and the selected background pixels, by using the following formulas:

$$P(\overline{(R,G,B)} \mid I_{(x_i,y_i)} = 1) = \sum_{j}^{N_F} w_j * \exp\left(-\frac{dist(\overline{(R,G,B)}, \overline{(R_j,G_j,B_j)})}{2*\beta_F}\right),$$

and $$P(\overline{(R,G,B)} \mid I_{(x_i,y_i)} = 0) = \sum_{j}^{N_B} w_j * \exp\left(-\frac{dist(\overline{(R,G,B)}, \overline{(R_j,G_j,B_j)})}{2*\beta_B}\right),$$

wherein $\overline{(R_j,G_j,B_j)}$ denotes a color feature vector of a $j^{th}$ clustering center,
wherein $P(\overline{(R_j,G_j,B_j)}\mid I_{(x_i,y_i)}=1)$ denotes the first color likelihood probability,
wherein $P(\overline{(R_j,G_j,B_j)}\mid I_{(x_i,y_i)}=0)$ denotes the second color likelihood probability,
wherein $N_F$ denotes a number of clustering centers of the selected foreground pixels,
wherein $N_B$ denotes a number of clustering centers of the selected background pixels,
wherein $dist(\overline{(R,G,B)},\overline{(R_j,G_j,B_j)})$ denotes an Euclidean distance from an origin color feature vector, $\overline{(R,G,B)}$, to the color feature vector of the $j^{th}$ clustering center, $\overline{(R_j,G_j,B_j)}$,
wherein $w_j$ denotes a ratio of a number of selected pixels of the $j^{th}$ clustering center to a number of total selected pixels,
wherein $\beta_F$ denotes a mean Euclidean distance between color feature vectors of different foreground clustering centers, and wherein $\beta_B$ denotes a mean Euclidean distance between color feature vectors of different background clustering centers. In such an example, the $\beta_F$ and $\beta_B$ can be defined by the following formulas:

$$\beta_F = \frac{2}{N_F(N_F-1)} \sum_{i=1}^{N_F} \sum_{j=1, j\neq i}^{N_F} dist(\overrightarrow{(R_i, G_i, B_i)}, \overrightarrow{(R_j, G_j, B_j)}), \text{ and}$$

$$\beta_B = \frac{2}{N_B(N_B-1)} \sum_{i=1}^{N_B} \sum_{j=1, j\neq i}^{N_B} dist(\overrightarrow{(R_i, G_i, B_i)}, \overrightarrow{(R_j, G_j, B_j)}).$$

The image processing circuitry 228 can also include a posteriori probability sub-circuitry 240 configured to determine a first a posteriori probability of at least part of the foreground and a second a posteriori probability of at least part of the background, according to the a priori probabilities, the first color likelihood probability and/or the second color likelihood probability. The a posteriori probability of at least part of the foreground can be determined with respect to at least part of the foreground of the image. For example, the a posteriori probability of at least part of the foreground can be determined with respect to a selected or determined region or set of pixels of the foreground of the image. Also, for example, the a posteriori probability of at least part of the foreground can be determined with respect to a pixel. In an example, the a posteriori probability of at least part of the foreground can be determined for each pixel of an image. Similarly, the a posteriori probability of at least part of the background can be determined with respect to at least part of the background of the image. For example, the a posteriori probability of at least part of the background can be determined with respect to a selected or determined region or set of pixels of the background of the image. Also, for example, the a posteriori probability of at least part of the background can be determined with respect to a pixel. In an example, the a posteriori probability of at least part of the background can be determined for each pixel of an image.

In an example, determining the a priori probability can include determining the probability of a given event occurring, which can be 1/N, where there are N mutually exclusive and exhaustive events and such events are equally likely. Additionally or alternatively, in an example, the determining the a priori probability can include determining the a priori probability of one of a given collection of K events, which results in K/N. In the examples described herein, the given event can be the head-shoulder foreground pixel appearing at a given pixel of an image to be segmented.

In an example, after obtaining the head-shoulder position a priori model and the color likelihood model and/or in the case that color feature vectors of the head-shoulder foreground sample pixels and the background sample pixels are known, the a posteriori probability of the head-shoulder foreground and the a posteriori probability of at least part of the background may be obtained through Bayesian statistics. For example, using Bayesian statistical methods, the a posteriori probability of an uncertain event, such as the occurrence of a foreground pixel or background pixel occurring at a given location of an image can be the conditional probability that is assigned after historical input is taken into account, such as input including or derived from the head-shoulder position a priori model and the color likelihood model and/or color feature vectors of the head-shoulder foreground sample pixels and the background sample pixels. Also, a posteriori probability distribution can be used as an alternative.

In an example, the a posteriori probability sub-circuitry 240 can be configured to determine a first a posteriori probability of at least part of the foreground and a second a posteriori probability of at least part of the background, according to the a priori probabilities, the first color likelihood probability, and the second color likelihood probability, by using the following formulas derived from Bayesian statistical methods.

$$P(I_{(x_i,y_i)}=1|\overrightarrow{(R,G,B)}) \propto P(I_{(x_i,y_i)}=1)*P(\overrightarrow{(R,G,B)}|I_{(x_i,y_i)}=1),$$
and $$P(I_{(x_i,y_i)}=0|\overrightarrow{(R,G,B)}) \propto (1-P(I_{(x_i,y_i)}=1))*P(\overrightarrow{(R,G,B)}|I_{(x_i,y_i)}=0),$$

wherein $P(I_{(x_i,y_i)}=1|\overrightarrow{(R,G,B)})$ denotes the a posteriori probability of the foreground at a pixel,
wherein $P(I_{(x_i,y_i)}=0|\overrightarrow{(R,G,B)})$ denotes the a posteriori probability of the background at a pixel,
wherein $P(I_{(x_i,y_i)}=1)$ denotes an a priori probability of a foreground pixel appearing a pixel $(x_i, y_i)$,
wherein $P(\overrightarrow{(R,G,B)}|I_{(x_i,y_i)}=1)$ denotes the first color likelihood probability, and
wherein $P(\overrightarrow{(R,G,B)}|I_{(x_i,y_i)}=0)$ denotes the second color likelihood probability.

The image processing circuitry 228 can also include segmentation sub-circuitry 242 configured to perform segmentation on the plurality of pixels, according to the first a posteriori probability and/or the second a posteriori probability. In an example, a head-shoulder segmentation model can obtained after obtaining the first a posteriori probability and the second a posteriori probability. The head-shoulder segmentation model can loaded as input into a graph cutting algorithm. Also, a max-flow min-cut theorem can be used with contrast information of the pixels in the image to segment the image to obtain a head-shoulder segmentation result.

Also, in examples where the a priori probability of a head-shoulder foreground pixel appearing at each pixel in the image is determined, according to the positioning result of the exterior contour points of face and the head-shoulder foreground sample pixels, and the background sample pixels are automatically selected on the basis of the a priori probability of the head-shoulder foreground, the benefit of not needing the user to participate in the process of selecting the sample pixels can be achieved. Also, since the image segmentation is performed based on the a priori probability and the color likelihood probability, the segmentation standard is detailed and the segmentation precision is high. In other words, in some of the examples described herein, the operations can be automated without need for manual input, so a user does not need to participate in the segmentation. For example, in some of these examples a user does not need to select pixels prior to segmentation. This is especially useful in a mobile device context were screen sizes are smaller and faster time to segmentation may be desired. Also, because the image segmentation described herein uses at least the a priori probability and the color likelihood probability, average segmentations are done with high precision.

Figure 3:
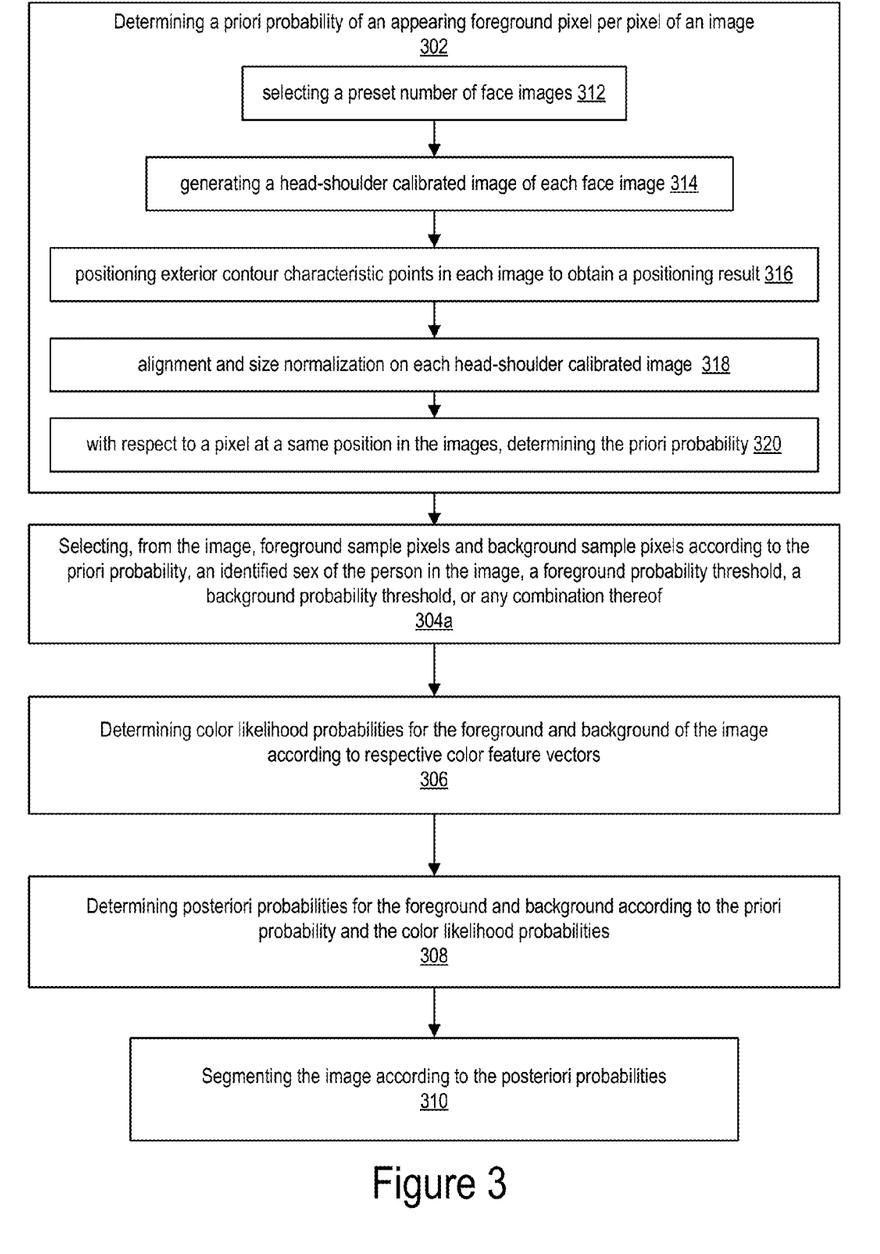
FIGS. 3 and 4 illustrate example operations of example circuitry of a device that can provide image segmentation, such as the device of FIG. 2.
Figure 4:
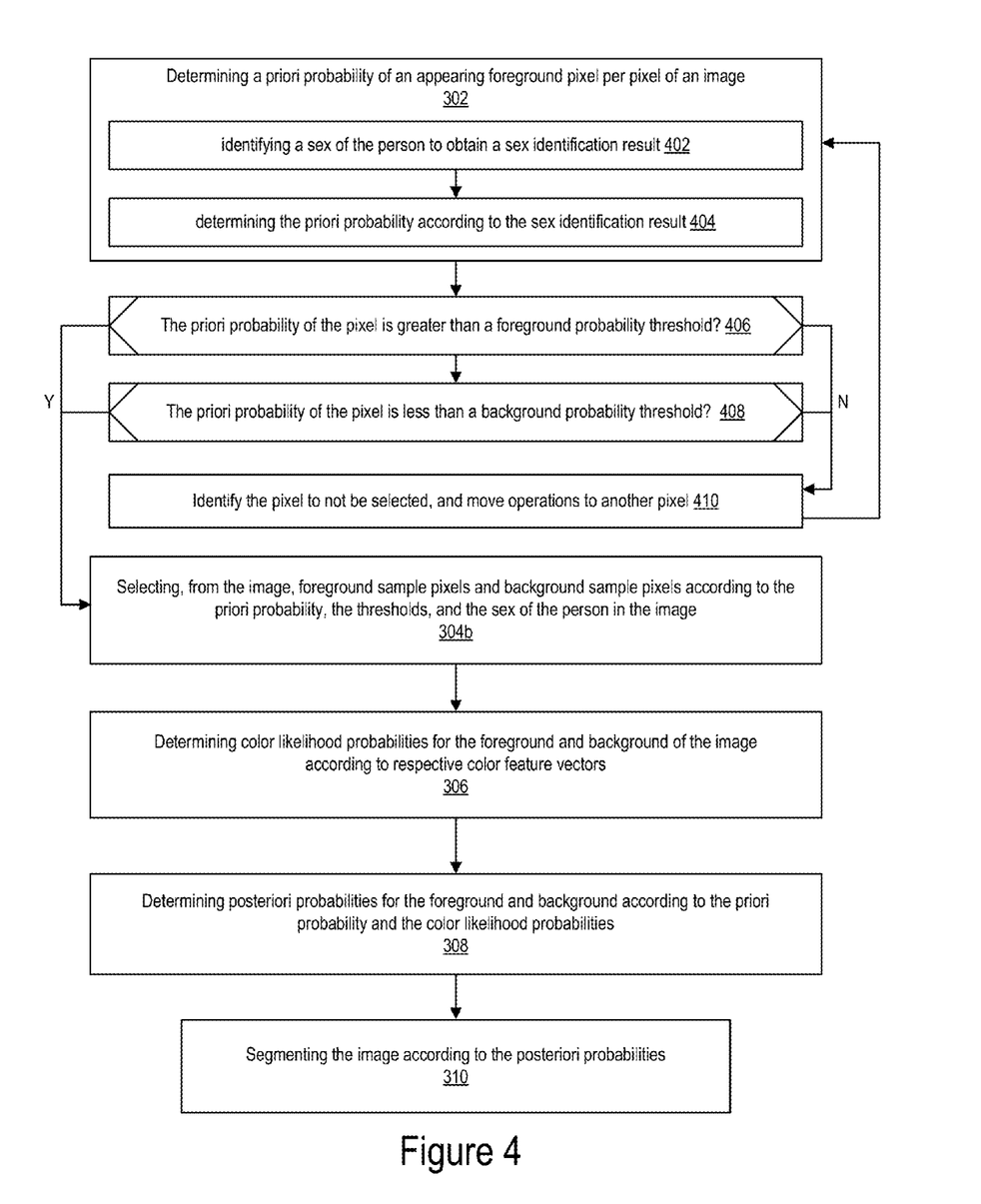

FIGS. 3 and 4 illustrate example operations of example circuitry of a device that can provide image segmentation, such as the device 202. The operations include circuitry determining an a priori probability of a foreground pixel appearing (such as a head-shoulder foreground pixel appearing) at each pixel in an image (such as an image having a preset size), according to a positioning result of exterior contour points of face at 302. Circuitry can also select from the image to be segmented foreground sample pixels (such as head-shoulder foreground sample pixels) and background sample pixels, according to the a priori probability, a foreground probability threshold (such as a head-shoulder foreground probability threshold), a background probability threshold, an identified sex of the person in the image, or any combination thereof at 304*a* (see FIG. 3 specifically). Both thresholds can be set in advance. At 306, a first color likelihood probability of the foreground of the image and a second color likelihood probability of the background of the image are determined, according to color feature vectors of the head-shoulder foreground sample pixels and color feature vectors of the background sample pixels. At 308, a first a posteriori probability of at least part of the foreground and a second a posteriori probability of at least part of the background are determined, according to the a priori probability, the first color likelihood probability, and the second color likelihood probability. At 310, circuitry performs segmentation (such as head-shoulder segmentation) on the image according to the first a posteriori probability and the second a posteriori probability.

Because these operations provide an a priori probability of a foreground pixel appearing at each pixel in the image, and foreground sample pixels and the background sample pixels are automatically selected based on the a priori probability, manual selection of sample pixels for initiating segmentation is omitted. This process creates a more seamless experience for a user. Also, since the image segmentation is performed based on an a priori probability and the color likelihood probabilities, segmentation precision can be high.

Specifically referring to FIG. 3, in such examples, the determining of the a priori probability at 302 can further include several operations. In the several operations, the determining of the a priori probability at 302 can include a process of establishing a head-shoulder position a priori model. In an example, due to differences between facial features of males and females, respective head-shoulder position a priori models for males and females can be separately established. In such an example, the operations can include selecting a preset number of face images of females and males at 312. In an example, the preset number can be any number within a range between 500 and 1000 images. The preset number of frontal face images of males and females can be stored in an image training library. These images can act as training data for obtaining the head-shoulder position a priori model for males and females, respectively. Operation 312 can be the first operation of the determining of the a priori probability at 302.

The operations at 302 can also include generating a head-shoulder calibrated image of each face image of females and males, according to a head-shoulder foreground calibration result on each face image at 314. In an example, the head-shoulder calibrated image of each face image (which could be a frontal face image) can be generated, according to a head-shoulder foreground calibration result made by a user manually. For example, in an off-line training process, the head-shoulder foreground calibration of the preset number of face images can be performed manually. Operation 314 can be the second operation of the determining of the a priori probability at 302.

In an example, after the calibration result of each frontal face image is obtained, a binary image can be generated (such as by the a priori probability sub-circuitry 234) and the binary image can function as the head-shoulder calibrated image. In an example, a region in the binary image having a first certain pixel grey level, such as a pixel grey level of 50% grey, can be considered the head-shoulder foreground. A region in that image having a second certain pixel grey level, such as a pixel grey level of 0% grey, can be considered the background of white. Alternatively, the region in that image having a third certain pixel grey level, such as a pixel grey level of 100% grey, can also be considered the background of black. Where the background is black, the foreground can be converted to white on such a grey scale; and where the background is white, the foreground can be converted to black on such a grey scale. This aforementioned mechanism of segmentation can occur for any color scale besides a grey color scale. Also, when performing head-shoulder foreground calibration on the face image per pixel, if the pixel is a head-shoulder foreground, the identity value of the pixel may be set to 1. If the pixel is a background, the identity value of the pixel may be set to 0. Such a mechanism can provide an indication of the calibration of pixels on the per pixel level.

The operations at 302 can also include positioning exterior contour characteristic points of a face in each face image to obtain a positioning result at 316. In an example, such positioning at 316 can include using any existing positioning algorithm for determining exterior contour points of a face. After positioning the exterior contour characteristic points of the face, position coordinate data of each exterior contour characteristic point of the face may be identified. Operation 316 can be the third operation of the determining of the a priori probability at 302.

The operations at 302 can also include performing alignment and size normalization on each head-shoulder calibrated image, according to the positioning result of the exterior contour points of face to obtain a plurality of images (such as images having a preset size) at 318. Where images have a preset size, that size may conform to any range of pixels for height and width. In examples, height and width may be the same (such as both height and width having a range of any number of pixels between 100 and 1000). In an example, with respect to each head-shoulder calibrated image, after obtaining the positioning result of the exterior contour characteristic points of the face, the head-shoulder calibrated images are can be adjusted to a uniform size, according to the positioning result of the exterior contour characteristic points of face (such as 400×400 pixels). Next, the head-shoulder calibrated images and the exterior contour characteristic points of the face are aligned according to the position coordinate data of the exterior contour characteristic points of the face. The head-shoulder calibrated images can then be normalized according to the uniform size (such as 400×400 pixels). These results in the images all being calibrated to the same size. Operation 318 can be the fourth operation of the determining of the a priori probability at 302.

In an example, before selecting the sample pixels, the exterior contour characteristic points of face of the image to be segmented may be positioned firstly and the size of the image to be segmented may be adjusted, according to the positioning result, so that the size of the image to be segmented is identical to the size of a template. Each pixel in the image to be segmented is can correspond to the pixel at the same position in the template. The a priori probability of a head-shoulder foreground pixel appearing at the pixel on a corresponding position in the template can be the a priori probability corresponding to the pixel at the same position in the image to be segmented.

The operations at 302 can also include performing, with respect to a pixel at a same position in the plurality of images (such as the calibrated images at 318), determining the a priori probability at that pixel at the same position, according to the head-shoulder foreground calibration result at 320. In an example, with respect to the pixel at the same position in the calibrated images, the a priori probability of a head-shoulder foreground pixel appearing at that pixel can be a frequency of that pixel in each face image of the images in the image training library being calibrated manually (or even automatically) as a head-shoulder foreground pixel. For example, if there are 1000 face images of females (such as 1000 frontal face images), and a certain pixel universal to all the female images is calibrated as a head-shoulder foreground in 500 face images of the 1000 face images of females, then the a priori probability of a head-shoulder foreground pixel appearing at that pixel is 50%. In other words, the probability of a head-shoulder foreground pixel appearing at each pixel may be obtained by determining the frequency of calibrating each pixel as a head-shoulder foreground pixel in the training data, whether the training data is generated manually or automatically. Analogously, such operations can be made for the face image of males too. This last operation at 320 can be the fifth operation of the determining of the a priori probability at 302.

In such examples, at operation 302, a sex of the person in the image to be segmented can identified to obtain a sex identification result, and an a priori probability corresponding to the image to be segmented can be determined, according to the sex identification result. This can facilitate the sub-operations 312-320 of operation 302. The identifying the sex of the subject of an image, such as by a subject's face, can be determined, according to an existing facial identification algorithm for determining sex of a subject in an image. In such examples, the operations can then move to operation 304b via operations 406 and/or 408 or directly to operation 304a by passing threshold comparison operations, such as the ones at operations 406 and 408. The maximum threshold may be a preset maximum a priori probability for a pixel to be a foreground pixel. The minimum threshold may be a preset minimum a priori probability for a pixel to be a background pixel. For example, the head-shoulder foreground probability threshold may be set to 80% and the background probability threshold may be set to 20%. In such a scenario, with respect to each pixel, if the a priori probability of the pixel is larger than 80%, then the pixel is determined as a foreground pixel; and if the a priori probability of the pixel is smaller than 20%, then the pixel is determined as a background pixel. The pixels having an a priori probability between 20% and 80% are not being processed in such an example. Also, in some examples, such thresholds may be obtained through experimentation or from feedback of live online system, such as system with an evolving online image training library.

Specifically referring to FIG. 4 at 304b, the selecting of the foreground sample pixels and the background sample pixels in the images is according to the sex of the person in the image, the thresholds, and the a priori probability. In such an example, the determination of the a priori probability can include: identifying a sex of the person in the image to be segmented to obtain a sex identification result at 402; and determining an a priori probability corresponding to the image to be segmented, according to the sex identification result at 404. With respect to each pixel in the image to be segmented, the operations move to determining whether the a priori probability of the pixel is larger than a foreground probability threshold at 406; if the a priori probability of the pixel is larger than the foreground probability threshold, identifying the pixel as a foreground sample pixel to select at 304b. With respect to each pixel in the image to be segmented, the operations move to determining whether the a priori probability of the pixel is smaller than a background probability threshold at 408; if the a priori probability of the pixel is smaller than the background probability threshold, identifying the pixel as a background sample pixel to select at 304b. Otherwise, the operations identify the pixel not for selection and move on to checking another pixel in the image at 410.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It should be appreciated that the present invention is not limited to the exact construction that has been described above and illustrated in the accompanying drawings, and that various modifications and changes can be made without departing from the scope thereof. It is intended that the scope of the invention should only be limited by the appended claims.

We claim:

1. A method for segmenting an image, comprising:
   receiving image data of an image including a background and a face of a person in a foreground, the image data including data representative of a plurality of pixels of the image and a positioning result of a plurality of exterior contour points of the face;
   determining a respective a priori probability of a foreground pixel appearing per pixel of the plurality of pixels, according to the positioning result of the plurality of exterior contour points of the face and a sex characteristic of the face;
   selecting foreground pixels and background pixels of the plurality of pixels, according to the a priori probabilities, a foreground probability threshold, and a background probability threshold;
   determining a first color likelihood probability of the foreground and a second color likelihood probability of the background, according to color feature vectors of the selected foreground pixels and the selected background pixels;
   determining a first a posteriori probability of at least part of the foreground and a second a posteriori probability of at least part of the background, according to the a priori probabilities, the first color likelihood probability and the second color likelihood probability; and
   performing segmentation on the plurality of pixels, according to the first a posteriori probability and the second a posteriori probability.

2. The method according to claim 1, wherein the determining of a respective a priori probability of a foreground pixel appearing per pixel of the plurality of pixels is also according to an aggregation of corresponding pixels from a group of images including faces of people, the aggregation including:

selecting a first group of images including faces of people;
generating a calibrated image for each image of the group of images, each calibrated image based on a foreground calibration result of a corresponding image of the group of images;
positioning exterior contour characteristic points of a face for each image of the group of images to obtain a positioning result per image of the group of images;
performing alignment and size normalization on each image of the calibrated images, according to the corresponding positioning results to generate a second group of images having a set alignment, size, or both; and
determining the a priori probability of a foreground pixel appearing for a pixel at a same position in each of the second group of images; according to the foreground calibration result.

3. The method according to claim 2, wherein the group of images including faces of people, only includes images of female faces.

4. The method according to claim 2, wherein the group of images including faces of people, only includes images of male faces.

5. The method according to claim 1, further comprising: identifying the sex characteristic of the face in the foreground.

6. The method according to claim 1, further comprising: identifying the sex characteristic of the face in the foreground; and
further selecting one or more of the foreground pixels and the background pixels, according the sex characteristic of the face in the foreground.

7. The method according to claim 1, further comprising: identifying the sex characteristic of the face in the foreground; and
setting one or more of the foreground probability threshold and the background probability threshold; according to the sex characteristic of the face in the foreground.

8. The method according to claim 1, wherein the determining of a respective a priori probability of a foreground pixel appearing per pixel of the plurality of pixels is according to the following formula:

$$P(I_{(x_i,y_i)} = 1) = \frac{\sum_{j=1}^{N} I_{(x_i,y_i)}^j}{N},$$

wherein $P(I_{(x_i,y_i)}=1)$ denotes an a priori probability of a foreground pixel appearing at a pixel $(x_i,y_i)$,
wherein $I_{(x_i,y_i)}^j$ denotes a calibration result at the pixel $(x_i,y_i)$ in a $j^{th}$ image of a group of images including faces of people,
wherein $I_{(x_i,y_i)}^j=1$ denotes that the pixel $(x_i,y_i)$ in the $j^{th}$ image is calibrated as a foreground, and
wherein N refers to a number of images in the group of images including faces of people.

9. The method according to claim 8, wherein $I_{(x_i,y_i)}^j=0$ denotes that the pixel $(x_i,y_i)$ in the $j^{th}$ image is calibrated as a background.

10. The method according to claim 1, wherein the selecting foreground pixels and the background pixels of the plurality of pixels, according to the a priori probabilities, the foreground probability threshold, and the background probability threshold, includes:
identifying and selecting a foreground pixel where a respective a priori probability of a given pixel of the plurality of pixels is greater than the foreground probability threshold; and
identifying and selecting a background pixel where a respective a priori probability of the given pixel of the plurality of pixels is less than the background probability threshold, wherein the background probability threshold is less than the foreground probability threshold.

11. The method according to claim 1, wherein the determining a first color likelihood probability of the foreground and a second color likelihood probability of the background, according to color feature vectors of the selected foreground pixels and the selected background pixels, is according to the following formulas:

$$P(\overline{(R,G,B)} \mid I_{(x_i,y_i)} = 1) = \sum_{j}^{N_F} w_j * \exp\left(-\frac{dist(\overline{(R,G,B)}, \overline{(R_j,G_j,B_j)})}{2 * \beta_F}\right),$$

and $$P(\overline{(R,G,B)} \mid I_{(x_i,y_i)} = 0) = \sum_{j}^{N_B} w_j * \exp\left(-\frac{dist(\overline{(R,G,B)}, \overline{(R_j,G_j,B_j)})}{2 * \beta_B}\right),$$

wherein $\overline{(R_j,G_j,B_j)}$ denotes a color feature vector of a $j^{th}$ clustering center,
wherein $P(\overline{(R_j,G_j,B_j)}|I_{(x_i,y_i)}=1)$ denotes the first color likelihood probability,
wherein $P(\overline{(R_j,G_j,B_j)}|I_{(x_i,y_i)}=0)$ denotes the second color likelihood probability,
wherein $N_F$ denotes a number of clustering centers of the selected foreground pixels,
wherein $N_B$ denotes a number of clustering centers of the selected background pixels,
wherein $dist(\overline{(R,G,B)},\overline{(R_j,G_j,B_j)})$ denotes an Euclidean distance from an origin color feature vector, $\overline{(R,G,B)}$, to the color feature vector of the $j^{th}$ clustering center, $\overline{(R_j,G_j,B_j)}$,
wherein $w_j$ denotes a ratio of a number of selected pixels of the $j^{th}$ clustering center to a number of total selected pixels,
wherein $\beta_F$ denotes a mean Euclidean distance between color feature vectors of different foreground clustering centers, and
wherein $\beta_B$ denotes a mean Euclidean distance between color feature vectors of different background clustering centers.

12. The method according to claim 11, wherein $\beta_F$ and $\beta_B$ are defined by the following formulas:

$$\beta_F = \frac{2}{N_F(N_F-1)} \sum_{i=1}^{N_F} \sum_{j=1, j \neq i}^{N_F} dist(\overline{(R_i,G_i,B_i)}, \overline{(R_j,G_j,B_j)}), \text{ and}$$

$$\beta_B = \frac{2}{N_B(N_B-1)} \sum_{i=1}^{N_B} \sum_{j=1, j \neq i}^{N_B} dist(\overline{(R_i,G_i,B_i)}, \overline{(R_j,G_j,B_j)}).$$

13. The method according to claim 1, wherein the determining of the first a posteriori probability and the second a posteriori probability, is further according to the following formulas:

$$P(I_{(x_i,y_i)}=1|\overline{(R,G,B)}) \propto P(I_{(x_i,y_i)}=1)*P(\overline{(R,G,B)}|I_{(x_i,y_i)}=1),$$
and $$P(I_{(x_i,y_i)}=0|\overline{(R,G,B)}) \propto (1-P(I_{(x_i,y_i)}=1))*P(\overline{(R,G,B)}|I_{(x_i,y_i)}=0),$$

wherein $P(I_{(x_i,y_i)}=1|\overline{(R,G,B)})$ denotes the a posteriori probability of the foreground at a pixel,
wherein $P(I_{(x_i,y_i)}=0|\overline{(R,G,B)})$ denotes the a posteriori probability of the background at a pixel $(x_i,y_i)$,
wherein $P(I_{(x_i,y_i)}=1)$ denotes an a priori probability of a foreground pixel appearing at a pixel $(x_i,y_i)$,
wherein $P(\overline{(R,G,B)}|I_{(x_i,y_i)}=1)$ denotes the first color likelihood probability, and
wherein $P(\overline{(R,G,B)}|I_{(x_i,y_i)}=0)$ denotes the second color likelihood probability.

14. A system for segmenting an image, comprising:
receiver circuitry, configured to receive image data of an image including a background and a face of a person in a foreground, the image data including data representative of a plurality of pixels of the image and a positioning result of a plurality of exterior contour points of the face;
image processing circuitry communicatively coupled to the receiver circuitry, including:
sub-circuitry configured to determine a respective a priori probability of a head-shoulder foreground pixel appearing per pixel of the plurality of pixels, according to the positioning result of the plurality of exterior contour points of the face and a sex characteristic of the face;
sub-circuitry configured to select foreground pixels and background pixels of the plurality of pixels, according to the a priori probabilities, a foreground probability threshold, and a background probability threshold;
sub-circuitry configured to determine a first color likelihood probability of the foreground and a second color likelihood probability of the background, according to color feature vectors of the selected foreground pixels and the selected background pixels;
sub-circuitry configured to determine a first a posteriori probability of at least part of the foreground and a second a posteriori probability of at least part of the background, according to the a priori probabilities, the first color likelihood probability and the second color likelihood probability; and
sub-circuitry configured to perform segmentation on the plurality of pixels, according to the first a posteriori probability and the second a posteriori probability; and
output circuitry configured to communicate the image with the segmented plurality of pixels to display circuitry.

15. The system according to claim 14, wherein the sub-circuitry configured to determine the respective a priori probability is further configured to determine the respective a priori probability, according an aggregation of corresponding pixels from a group of images including faces of people; the aggregation performed by sub-circuitry of the image processing circuitry, configured to:
select a first group of images including faces of people;
generate a calibrated image for each image of the group of images, each calibrated image based on a foreground calibration result of a corresponding image of the group of images;
position exterior contour characteristic points of a face for each image of the group of images to obtain a positioning result per image of the group of images;
perform alignment and size normalization on each image of the calibrated images, according to the positioning result to generate a second group of images with each image having a set alignment, size, or both; and
determine the a priori probability of a foreground pixel appearing for a pixel at a same position in each of the second group of images; according to the foreground calibration result.

16. The system according to claim 15, wherein the group of images including faces of people, only includes images of female faces.

17. The system according to claim 15, wherein the group of images including faces of people, only includes images of male faces.

18. A non-transitory computer readable medium, comprising:
instructions executable by a processor to receive image data of an image including a background and a face of a person in a foreground, the image data including data representative of a plurality of pixels of the image and a positioning result of a plurality of exterior contour points of the face;
instructions executable by a processor to identify a sex characteristic of the face in the foreground;
instructions executable by a processor to determine a respective a priori probability of a foreground pixel appearing per pixel of the plurality of pixels, according to the positioning result of the plurality of exterior contour points of the face and the sex characteristic of the face;
instructions executable by a processor to select foreground pixels and background pixels of the plurality of pixels, according to the a priori probabilities, a foreground probability threshold, and a background probability threshold;
instructions executable by a processor to determine a first color likelihood probability of the foreground and a second color likelihood probability of the background, according to color feature vectors of the selected foreground pixels and the selected background pixels;
instructions executable by a processor to determine a first a posteriori probability of at leak part of the foreground and a second a posteriori probability of at least part of the background, according to the a priori probabilities, the first color likelihood probability and the second color likelihood probability; and
instructions executable by a processor to perform segmentation on the plurality of pixels, according to the first a posteriori probability and the second a posteriori probability.

19. The non-transitory computer readable medium according to claim 18, further comprising instructions executable to determine the first color likelihood probability of the foreground and the second color likelihood probability of the background, according to the color feature vectors of the selected foreground pixels and the selected background pixels, according to the following formulas:

$$P(\overline{(R,G,B)}|I_{(x_i,y_i)}=1) = \sum_{j}^{N_F} w_j * \exp\left(-\frac{dist(\overline{(R,G,B)},\overline{(R_j,G_j,B_j)})}{2*\beta_F}\right),$$

and

-continued $$P(\overline{(R,G,B)} \mid I_{(x_i,y_i)} = 0) = \sum_{j}^{N_B} w_j * \exp\left(-\frac{dist(\overline{(R,G,B)}, \overline{(R_j,G_j,B_j)})}{2*\beta_B}\right),$$

wherein $\overline{(R_j,G_j,B_j)}$ denotes a color feature vector of a $j^{th}$ clustering center, wherein $P(\overline{(R,G,B)}|I_{(x_i,y_i)}=1)$ denotes the first color likelihood probability, wherein $P(\overline{(R,G,B)}|I_{(x_i,y_i)}=0)$ denotes the second color likelihood probability, wherein $N_F$ denotes a number of clustering centers of the selected foreground pixels, wherein $N_B$ denotes a number of clustering centers of the selected background pixels, wherein $dist(\overline{(R,G,B)},\overline{(R_j,G_j,B_j)})$ denotes an Euclidean distance from an origin color feature vector, $\overline{(R,G,B)}$, to the color feature vector of the $j^{th}$ clustering center, $\overline{(R_j,G_j,B_j)}$, wherein $w_j$ denotes a ratio of a number of selected pixels of the $j^{th}$ clustering center to a number of total selected pixels, wherein $\beta_F$ denotes a mean Euclidean distance between color feature vectors of different foreground clustering centers, and wherein $\beta_B$ denotes a mean Euclidean distance between color feature vectors of different background clustering centers, and wherein $\beta_F$ and $\beta_B$ are defined by the following formulas:

$$\beta_F = \frac{2}{N_F(N_F-1)} \sum_{i=1}^{N_F} \sum_{j=1,j\neq i}^{N_F} dist(\overline{(R_i,G_i,B_i)},\overline{(R_j,G_j,B_j)}), \text{ and}$$

$$\beta_B = \frac{2}{N_B(N_B-1)} \sum_{i=1}^{N_B} \sum_{j=1,j\neq i}^{N_B} dist(\overline{(R_i,G_i,B_i)},\overline{(R_j,G_j,B_j)}).$$

20. The non-transitory computer readable medium according to claim 18, further comprising instructions executable to determine the first a posteriori probability and the second a posteriori probability, according to the a priori probabilities, the first color likelihood probability, and the second color likelihood probability and according to the following formulas:

$$P(I_{(x_i,y_i)}=1|\overline{(R,G,B)}) \propto P(I_{(x_i,y_i)}=1)*P(\overline{(R,G,B)}|I_{(x_i,y_i)}=1),$$
and $$P(I_{(x_i,y_i)}=0|\overline{(R,G,B)}) \propto (1-P(I_{(x_i,y_i)}=1))*P(\overline{(R,G,B)}|I_{(x_i,y_i)}=0),$$

wherein $P(I_{(x_i,y_i)}=1|\overline{(R,G,B)})$ denotes the a posteriori probability of the foreground at a pixel, wherein $P(I_{(x_i,y_i)}=0|\overline{(R,G,B)})$ denotes the a posteriori probability of the background at a pixel $(x_i,y_i)$, wherein $P(I_{(x_i,y_i)}=1)$ denotes an a priori probability of a foreground pixel appearing at a pixel $(x_i,y_i)$, wherein $P(\overline{(R,G,B)}|I_{(x_i,y_i)}=1)$ denotes the first color likelihood probability, and wherein $P(\overline{(R,G,B)}|I_{(x_i,y_i)}=0)$ denotes the second color likelihood probability.

\* \* \* \* \*

UNITED STATES PATENT AND TRADEMARK OFFICE
CERTIFICATE OF CORRECTION

PATENT NO. : 9,665,945 B2  
APPLICATION NO. : 14/669888  
DATED : May 30, 2017  
INVENTOR(S) : Lin Wang et al.

Page 1 of 1

It is certified that error appears in the above-identified patent and that said Letters Patent is hereby corrected as shown below:

In the Claims

Column 19, Line 9 "a pixel," should be -- a pixel $(x_i, y_i)$, --

Column 19, Line 57 "people;" should be -- people, --

Column 19, Line 67 "images;" should be -- images, --

Column 20, Line 42 "leak" should be -- least --

Column 22, Line 23 "a pixel," should be -- a pixel $(x_i, y_i)$, --

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*